(12) United States Patent
Poeller et al.

(10) Patent No.: US 12,296,527 B2
(45) Date of Patent: May 13, 2025

(54) DUAL CURE POLYURETHANE FORMULATIONS FOR 3D PRINTING APPLICATIONS

(71) Applicant: Henkel AG & Co. KGaA, Duesseldorf (DE)

(72) Inventors: Sascha Poeller, Duisburg (DE); Manuel Schiel, Duesseldorf (DE); Tanja Rossberg, Haan (DE); Andreas Ferencz, Duesseldorf (DE); Tim Welters, Hilden (DE); Uwe Franken, Dormagen (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 381 days.

(21) Appl. No.: 17/453,948

(22) Filed: Nov. 8, 2021

(65) Prior Publication Data
US 2022/0055285 A1    Feb. 24, 2022

Related U.S. Application Data

(63) Continuation of application No. PCT/EP2020/063157, filed on May 12, 2020.

(30) Foreign Application Priority Data

May 13, 2019 (EP) .................... 19174173

(51) Int. Cl.
| | |
|---|---|
| *B29C 64/106* | (2017.01) |
| *B29C 64/188* | (2017.01) |
| *B29C 64/209* | (2017.01) |
| *B29C 64/245* | (2017.01) |
| *B29C 64/264* | (2017.01) |
| *B33Y 10/00* | (2015.01) |
| *B33Y 40/20* | (2020.01) |
| *B33Y 70/00* | (2020.01) |
| *B29K 75/00* | (2006.01) |
| *B29K 105/00* | (2006.01) |

(52) U.S. Cl.
CPC .......... *B29C 64/106* (2017.08); *B29C 64/188* (2017.08); *B29C 64/209* (2017.08); *B29C 64/245* (2017.08); *B29C 64/264* (2017.08); *B33Y 10/00* (2014.12); *B33Y 40/20* (2020.01); *B33Y 70/00* (2014.12); *B29K 2075/00* (2013.01); *B29K 2105/0002* (2013.01); *B29K 2105/0014* (2013.01); *B29K 2105/007* (2013.01); *B29K 2105/0094* (2013.01)

(58) Field of Classification Search
CPC ...... B29C 64/106; B29C 64/188; B33Y 70/00
See application file for complete search history.

(56) References Cited

U.S. PATENT DOCUMENTS

| | | |
|---|---|---|
| 2016/0271872 A1 | 9/2016 | Sand |
| 2017/0113416 A1 | 4/2017 | Desimone et al. |
| 2017/0120515 A1 | 5/2017 | Rolland et al. |
| 2017/0360534 A1 | 12/2017 | Sun et al. |
| 2022/0033678 A1* | 2/2022 | Fuchs ................ C08G 18/4238 |

FOREIGN PATENT DOCUMENTS

WO    2019234038 A1    12/2019

OTHER PUBLICATIONS

International Search Report issued in connection with International Application No. PCT/E2020/063157 mailed on Jul. 17, 2020.

\* cited by examiner

*Primary Examiner* — James Sanders
(74) *Attorney, Agent, or Firm* — Steven C. Bauman

(57) ABSTRACT

The present invention lies in the field of 3D printing methods. In particular, the invention relates to 3D printing methods for the production of a 3D part in a layer-by-layer manner, wherein the printable composition is a pasty polyurethane composition comprising at least one polyisocyanate resin, at least one monomer and/or prepolymer that is polymerizable by exposure to radiation and at least one photoinitiator, wherein the pasty polyurethane composition has a viscosity factor (1.5/15) of at least 2 at application temperature.

9 Claims, No Drawings

DUAL CURE POLYURETHANE FORMULATIONS FOR 3D PRINTING APPLICATIONS

The present invention lies in the field of 3D printing methods. In particular, the invention relates to 3D printing methods for the production of a 3D part in a layer-by-layer manner, wherein a pasty polyurethane 3D printing composition is used.

In 3D printing applications, also referred herein as additive manufacturing, a wide variety of polymeric materials are used. In various of these applications, three-dimensional objects are formed in a layer-by-layer manner, i.e. by repeatedly printing material layers on top of each other to form the desired object. Many of the existing polymeric compositions for 3D printing are liquid or are liquefied for the actual printing, for example by melting, and become solid after being printed, for example in form of filaments.

In 3D printing applications that are used for forming objects in a layer-by-layer manner, one drawback is that after printing a layer on top of an already printed layer the adhesion between the layers is not sufficient. This problem is particularly pronounced for printing with filaments. Here the next layer is printed on top of a usually fully cooled and solidified layer, which might lead to an insufficient interlayer adhesion. In the event of reactive liquid printable compositions the build up of a 3D structure is often difficult due to the low viscosity of the composition, which might lead to a deformation of the printed part and/or a poor resolution.

While it is desirable to provide polymeric 3D printing materials with elastomeric properties, the use of such materials has inter alia been hampered by the above problems.

The present invention solves these issues by providing a method for additive manufacturing that uses a pasty polyurethane material with a special viscosity factor as described below. By using the pasty polyurethane compositions, which are at the same time radiation curable and heat curable, the thixotropic behaviour ensures that the printed layer is already dimensional stable, which can be preferably supported by radiation curing, while at the same time a good wettability of the second layer is maintained due to the still uncured polyurethane portion. The final heat cure would determine the final thermoset properties, like good mechanical strength and good chemical resistance. The finally cured part exhibits an outstanding smooth surface, showing virtually no interfaces between the applied layers any more, as a result of the viscosity properties of the printable composition and the dual cure thereof.

In a first aspect, the present invention relates to a method for additive manufacturing a three-dimensional part in a layer-by-layer manner, wherein the method comprises
(i) providing a carrier substrate to support the three-dimensional part and a print head connected to a reservoir of a printable composition;
(ii) printing the printable composition with the print head in form of extrudate strands onto the carrier substrate to form a first layer;
(iii) printing the printable composition with the print head in form of extrudate strand onto the first layer to form a second layer;
(iv) optionally repeating step (iii) at least once to form a third or subsequent layer;
(v) exposing the printable composition directly after printing and/or after each layer application and/or after application of multiple layer to radiation, preferably UV radiation; and
(vi) curing the printed layers of the reactive curable printable composition, preferably by heating, to obtain the three-dimensional part;
wherein the printable composition is a pasty polyurethane composition comprising
at least one polyisocyanate;
at least one monomer and/or prepolymer that is polymerizable by exposure to radiation, preferably a (meth)acrylate, preferably a (meth)acrylate containing at least one hydroxyl group; and
at least one photoinitiator;
wherein the pasty polyurethane composition has a viscosity factor (1.5/15) of at least 2 at application temperature.

In another aspect, the invention also relates to the three-dimensional articles manufactured by use of the methods described herein.

In a further aspect, the invention also relates to the use a pasty polyurethane composition as described above for 3D printing.

"Additive manufacturing" and "3D printing" are used interchangeably herein to refer to methods for the formation of three-dimensional objects or parts in which material is joined or solidified, typically under computer control, with material being added together in a layer-by-layer manner.

"Layer-by-layer", as used herein, relates to a method of additive manufacturing in which an object is produced by printing separate layers on top of each other such that they form the desired shape. It is typically important to achieve sufficient inter-layer adhesion to produce a stable three-dimensional object.

"Print head", as used herein, relates to the part of an apparatus used for depositing the printing material in form of a layer onto a support or an already formed layer. The print head is typically freely movable to allow formation of layers in the desired shape on a substrate (typically by horizontal movement) and print layers on top of already existing layers (typically be retracting the print head in the vertical direction such that the distance to the substrate or printed layer is adjusted to be suitable for printing the next layer). Alternatively, the print head may be fixed and the substrate is moved relative to the print head or both are movable relative to each other. The print head has typically at least one orifice through which the printable material is deposited. Herein, the printable material is preferably in form of a pasty polymeric composition, so that the print head orifice can resemble an extruder die and the printed material be in form of an extrudate strand. Also reference is made herein to a "print head orifice", it is understood that this term also includes embodiments where the print head has more than one opening/orifice.

"Extrudate strand", as used herein, relates to the form of the printed/extruded material once it leaves the print heads orifice and forms the layer. It is in form of a strand that extends in the direction of the movement of the print head. Strands printed next to each other, for example parallel to each other, can together form one layer (for this they may fuse to a certain extent), while strands printed on top of an existing strand form the next layer in the layer-by-layer manufacturing process.

The term "curable" is to be understood to mean that, under the influence of external conditions, in particular under the influence of radiation and/or heat present in the environment and/or supplied for the purpose, the composition can pass from a relatively flexible state, optionally possessing plastic ductility, to a harder state. In general, the crosslinking can take place by means of chemical and/or physical influences, for example, by the supply of energy in the form of heat, light or other electromagnetic radiation, but also by simply bringing the composition into contact with air, atmospheric moisture, water, or a reactive component. "Radiation curable", as used herein, thus relates to curing under the influence, e.g. exposure, to radiation, such as electromagnetic radiation, in particular UV radiation or visible light. UV radiation is in the range of 100 to 400 nanometers (nm). Visible light is in the range of 400 to 780 nanometers (nm). "heat-curable", as used herein, thus relates to curing under the influence of heat, typically by heating the three-dimensional part in an oven to temperatures above 100° C.

Provided reference is made to molecular weights of oligomers or polymers in the present application, the quantities, unless otherwise stated, refer to the number average, i.e., the $M_n$ value, and not to the weight average molecular weight. The number average molecular weight $M_n$, as well as the weight average molecular weight $M_w$, is determined according to the present invention by gel permeation chromatography (GPC, also known as SEC) at 23° C. using a styrene standard. The molecular weight can be determined by gel permeation chromatography (GPC) with tetrahydrofuran (THF) as the eluent according to DIN 55672-1:2007-08, preferably at 23° C. or 35° C. Molecular weights of monomeric compounds are calculated based on the respective molecular formula and the known molecular weights of the individual atoms. These methods are known to one skilled in the art.

"At least one," as used herein, refers to 1 or more, i.e., 1, 2, 3, 4, 5, 6, 7, 8, 9, or more. In regard to an ingredient, the term relates to the type of ingredient and not to the absolute number of molecules. "At least one polymer" thus means, for example, at least one type of polymer, i.e., that a type of polymer or a mixture of a number of different polymers can be used. Together with weight data, the term refers to all compounds of the given type, contained in a composition/mixture, i.e., that the composition contains no other compounds of this type beyond the given amount of the relevant compounds.

All percentage data, provided in connection with the compositions described herein, refer to % by weight, based in each case on the relevant mixture, unless explicitly indicated otherwise.

The invention relates to methods for additive manufacturing a three-dimensional part in a layer-by-layer manner, wherein the method comprises, in a first step, providing a carrier substrate to support the three-dimensional part and a print head connected to a reservoir of a printable composition. The carrier substrate may be any suitable substrate. It may be a printing bed that may be flat, essentially flat or curved. It can be made of any suitable material and can also be in form of a tray. In various embodiments, it can be made of metal, glass or plastic. It is preferably designed such that it allows easy release of the layers printed thereon, e.g. being inert towards the printed material and any potential curing process used.

In various embodiments, the print head forms part of a printing apparatus and is connected to at least one reservoir of at least one printable composition. While the print head may, in various embodiments, be connected to multiple reservoirs of different printable compositions, it is herein preferred that the print head is connected to one reservoir of one printable composition. The print head is that part of the printing apparatus that deposits the printing material onto the substrate or an already formed layer in the desired pattern. To achieve this, it is connected to a feeding means through which the print head is fed with the printable composition, such as a pump, conveyor and the like, via tubing/pipes. The print head has an orifice or nozzle through which the printable composition leaves the print head and is deposited on a surface. The orifice/nozzle may have any desired shape, but is typically an essentially circular opening. The shape of the print head and the print head orifice may define the shape of the printed material strand. In various embodiments, the print head and/or its orifice are designed such that due to the shear forces that act on the printable composition during transport and extrusion/printing, the viscosity is lowered to such a degree that the composition is printable with the selected device but increases once the layer has been formed such that the formed object retains its form even before curing is completed. The printing method may include heating the composition and/or the printhead. Typical application temperatures for printing/extrusion range from about 10° C. to about 120° C., typically from about 15° C. to about 80° C. In some embodiments, application temperatures are preferably in the range of 15° C. to 40° C., preferably 20° C. to 30° C., more preferably the application temperature is about 25° C. In some embodiments, application temperatures are preferably in the range of 40° C. to 80° C., preferably 45° C. to 60° C., more preferably the application temperature is about 55° C.

The reservoir may be a cartridge, tank or similar storage container in which the printable composition is stored and which is connected to the print head with a suitable feeding line, tubing or the like. The transport of the printable material may be facilitated by a transporting device, such as a pump or conveyor screw, all of which are known in the field.

The print head is designed such that it allows printing the printable composition with the print head in form of extrudate strands onto the carrier substrate to form a first layer in the next step of the inventive method. For this, as already described above, the print head, the carrier substrate or both may be movable. Typically, the print head is moved over the carrier substrate and extrudate strands are deposited onto the substrate in the desired pattern. The layers are formed by depositing strands next to each other. Once the first layer is formed, the method continues by printing the printable composition with the print head in form of extrudate strand onto the first layer to form a second layer. The second layer may be similar to or different in shape relative to the first layer but is formed on top of the first layer. To form the three-dimensional object, the steps of forming a layer on top of the already formed layers may be repeated to form a third, fourth, fifth and subsequent layer. Computer programs exist that allow to devise a layer-by-layer printing process for a given shape or object.

In one embodiment of the invention, the distance of the print head orifice to the carrier substrate or the already formed layers is equal to or greater than the thickness of the printed extrudate strand. In preferred embodiments, it is greater than the thickness of the printed extrudate strand. In various embodiments, the ratio of the distance of the print head orifice to the carrier substrate or the already formed layers during printing to the thickness of the printed extrudate strand ranges from 1.0 to 3.0, preferably 1.0 to 2.0, more preferably 1.1 to 1.8. Keeping said distance of the print head to the substrate or already printed layer ensures that shear stress on the already formed layers is minimized. As a result, deformation of the formed layers can be avoided.

The printable composition is exposed directly after printing and/or after each layer application and/or after application of multiple layer to radiation, preferably UV radiation. Therefore, radiation curing of the polyurethane composition may occur directly after printing, for example in that the printed extrudate strands are exposed to radiation directly after they left the print head orifice or once they have been deposited on the substrate or an underlying layer, separately for each strand/layer application and/or after more than one layer application or after the complete object has been formed or a combination of these. In one embodiment, the printable composition is exposed to radiation directly after printing. This is of special advantage, since due to the radiation curing directly after application the strands directly gain additional stability on top of the stability according to the thixotropic/paste behaviour and bridging parts could be printed without a support structure. In such an embodiment, it might also be beneficial that the printed composition is again exposed to radiation at a later stage, preferably the printed composition is exposed again to radiation after the complete object has been formed.

In one preferred embodiment, the method comprises
(i) providing a carrier substrate to support the three-dimensional part and a print head connected to a reservoir of a printable composition;
(ii) printing the printable composition with the print head in form of extrudate strands onto the carrier substrate to form a first layer, wherein the printable composition is exposed to radiation directly after printing and/or after application of this layer, preferably directly after printing;
(iii) printing the printable composition with the print head in form of extrudate strand onto the first layer to form a second layer; wherein the printable composition is exposed to radiation directly after printing and/or after application of this layer, preferably directly after printing;
(iv) optionally repeating step (iii) at least once to form a third or subsequent layer;
(v) optionally exposing the printable composition again to radiation after application of multiple layers or after the complete object has been formed; and
(vi) curing the printed layers of the reactive curable printable composition, preferably by heating, to obtain the three-dimensional part.

The printable composition is a pasty polyurethane reactive composition comprising
at least one polyisocyanate resin;
at least one monomer and/or prepolymer that is polymerizable by exposure to radiation, preferably a (meth)acrylate, preferably a (meth)acrylate containing at least one hydroxyl group; and
at least one photoinitiator;
wherein the pasty polyurethane composition has a viscosity factor (1.5/15) of at least 2 at application temperature.

The printable polyurethane compositions are in form of a printable paste. "Paste" and "pasty", as used herein, relate to liquid compositions as described in more detail herein. The pastes are shear-thinning and/or thixotropic liquids, which means their viscosity is decreased when subjected to shear forces. The decrease in viscosity upon application of shear stress is such that the printable compositions are printable/extrudable by 3D printing apparatuses and print heads, as described herein, but at the same time are stable enough to maintain the form until the first radiation curing, usually UV curing, is completed. The printable polyurethane compositions have therefore a viscosity factor (1.5/15) at application temperature of at least 2.0, preferably at least 3.0, more preferably 4.0 or more. Such a viscosity factor (1.5/15) ensures that the material once extruded to form a 3D object is stable enough to maintain the form until curing is completed. The viscosity factor (x/y) is the viscosity ratio of the viscosity of the composition at a shear rate of x/s to the viscosity at a shear rate of y/s at application temperature. Therefore, the viscosity factor (1.5/15) is the viscosity of the composition at a shear rate of 1.5/s divided by the viscosity at a shear rate of 15/s. Viscosities as described herein if not explicitly indicated otherwise, are determined using MCR302 rheometer from Anton-Paar GmbH using the method as set forth in BS EN ISO 3219:1995. Specifically, the measuring conditions are as follows: Geometry: 25 mm plate/plate geometry; Gap: 0.2 mm, F=0N, under nitrogen, 25° C., Shear rate 0.3 to 40 1/s. To determine the viscosity factor (1.5/15) the formulation is kept for 30 sec under constant shear of 1.5 s-1, followed by 30 sec of constant shear with 15 s-1, both in rotation mode. The viscosity factor (1.5/15) is determined by dividing the two plateau values of the viscosities at the two shear rates. The other viscosity factors can be determined accordingly.

In various embodiments, the printable compositions have a viscosity factor (0.1/1) at a temperature in the range of 15° C. to 40° C., preferably 20° C. to 30° C., more preferably at 25° C. of at least 2.0, preferably at least 3.0, more preferably 4.0 or more. In other embodiments, the printable compositions have a viscosity factor (0.1/1) at a temperature in the range of 40° C. to 80° C., preferably 45° C. to 60° C., more preferably at 55° C. of at least 2.0, preferably at least 3.0, more preferably 4.0 or more.

In various embodiments, the printable compositions have a viscosity factor (1.5/15) at a temperature in the range of 15° C. to 40° C., preferably 20° C. to 30° C., more preferably at 25° C. of at least 2.0, preferably at least 3.0, more preferably 4.0 or more. In other embodiments, the printable compositions have a viscosity factor (1.5/15) at a temperature in the range of 40° C. to 80° C., preferably 45° C. to 60° C., more preferably at 55° C. of at least 2.0, preferably at least 3.0, more preferably 4.0 or more.

In other embodiments, the pasty polyurethane composition has also a viscosity factor (5/50) at application temperature, preferably at 25° C. or 55° C., of at least 1.5, preferably at least 2.0, more preferably at least 3.0. Pasty polyurethane compositions which have the desired value of this additional second viscosity factor (5/50) show a beneficial thixotropic behaviour. Especially preferred are compositions with a viscosity factor (1.5/15) greater than the viscosity factor (5/50) at application temperature, preferably at 25° C. or at 55° C.

While there is principally no upper limit, it may be preferred that the viscosity factor (1.5/15) and/or the viscosity factor (5/50) at the mentioned application temperature do not exceed 100, preferably 50, more preferably 30.

In especially preferred embodiments, the viscosity factor decreases towards higher shear rates, preferably the viscosity factor (0.1/1) has a greater value than the viscosity factor (1.5/15) and/or the viscosity factor (1.5/15) has a greater value than the viscosity factor (5/50), especially the viscosity factor (0.1/1) has a greater value than the viscosity factor (1.5/15) and the viscosity factor (1.5/15) has a greater value than the viscosity factor (5/50), respectively at application temperature, preferably at 25° C. or at 55° C. Due to the short shear recovery the printing properties are even more beneficial.

In preferred embodiments, the pasty polyurethane composition has a viscosity at a shear rate of 1.5/s of at least 10 Pas, preferably at least 20 Pas, more preferably at least 30 Pas. In other embodiments, the pasty polyurethane composition has a viscosity at a shear rate of 1.5/s of at most 2000 Pas, preferably at most 1500 Pas, more preferably at most 1300 Pas. Preferably the pasty polyurethane composition has a viscosity at a shear rate of 1.5/s in the range from 10 to 2000 Pas, preferably from 20 to 1500 Pas, more preferably from 30 to 1300 Pas.

As first component the pasty polyurethane composition comprises at least one polyisocyanate.

A "polyisocyanate" is understood to be a compound which has at least two isocyanate groups —NCO. This compound does not have to be a polymer, and instead is frequently a low molecular compound.

The polyisocyanates suitable for preparing the polyurethanes include ethylene diisocyanate, 1,4-tetramethylene diisocyanate, 1,4-tetramethoxybutane diisocyanate, 1,6-hexamethylene diisocyanate (HDI), cyclobutane-1,3-diisocyanate, cyclohexane-1,3- and -1,4-diisocyanate, bis(2-isocyanatoethyl)fumarate, 1-isocyanato-3,3,5-trimethyl-5-isocyanatomethylcyclohexane (isophorone diisocyanate, IPDI), 2,4- and 2,6-hexahydrotoluylene diisocyanate, hexahydro-1,3- or -1,4-phenylene diisocyanate, benzidine diisocyanate, naphthalene-1,5-diisocyanate, 1,6-diisocyanato-2,2,4-trimethylhexane, 1,6-diisocyanato-2,4,4-trimethylhexane, xylylene diisocyanate (XDI), tetramethylxylylene diisocyanate (TMXDI), 1,3- and 1,4-phenylene diisocyanate, 2,4- or 2,6-toluylene diisocyanate (TDI), 2,4'-diphenylmethane diisocyanate, 2,2'-diphenylmethane diisocyanate, or 4,4'-diphenylmethane diisocyanate (MDI), and the isomeric mixtures thereof. Also suitable are partially or completely hydrogenated cycloalkyl derivatives of MDI, for example completely hydrogenated MDI (H12-MDI), alkyl-substituted diphenylmethane diisocyanates, for example mono-, di-, tri-, or tetraalkyldiphenylmethane diisocyanate and the partially or completely hydrogenated cycloalkyl derivatives thereof, 4,4'-diisocyanatophenylperfluorethane, phthalic acid-bis-isocyanatoethyl ester, 1 chloromethylphenyl-2,4- or -2,6-diisocyanate, 1-bromomethylphenyl-2,4- or -2,6-diisocyanate, 3,3'-bis-chloromethyl ether-4,4'-diphenyl diisocyanate, sulfur-containing diisocyanates such as those obtainable by reacting 2 moles diisocyanate with 1 mole thiodiglycol or dihydroxydihexyl sulfide, diisocyanates of dimer fatty acids, or mixtures of two or more of the named diisocyanates.

Other polyisocyanates suitable include isocyanates with a functionality of three or more obtainable, for example, by oligomerization of diisocyanates, more particularly by oligomerization of the isocyanates mentioned above. Examples of such tri- and higher isocyanates are the triisocyanurates of HDI or IPDI or mixtures thereof or mixed triisocyanurates thereof and polyphenyl methylene polyisocyanate obtainable by phosgenation of aniline/formaldehyde condensates.

The polyisocyanate is preferably an aliphatic polyisocyanate, more preferably a polyisocyanate based on or hexamethylene diisocyanate.

Typically the amount of the at least one polyisocyante is in the range from 2 to 50% by weight of the entire printable composition, preferably 5 to 45% by weight, in particular 10 to 40% by weight, particularly preferably 15 to 30% by weight.

In various embodiments, the polyisocyanate described above is combined with a compound having NCO-reactive groups, such as amine or hydroxy groups. In various embodiments, these compounds are polyols, as defined below, such as polyether polyols, polyester polyols, polycarbonates and the like. If reacted with a molar excess of NCO groups relate to the NCO-reactive groups present in these compounds, NCO-terminated polyurethane compounds, such as (pre)polymers are obtained.

For polyurethane synthesis, there may thus be a stoichiometric excess of NCO groups of the polyisocyanates with respect to the hydroxy groups of the polyols, "the polyols" and "the polyisocyanates" in each case also encompassing the presence of only one polyol and/or only one polyisocyanate. This stoichiometric excess must exist under the process conditions; i.e., it is not sufficient when the excess is nominally present, but a portion of the NCO groups of the polyisocyanates reacts with reactants other than the OH groups of the polyols, for example with monofunctional alcohols, so that there is a de facto shortage of NCO groups of the polyisocyanates with respect to the OH groups of the polyols. The ratio of the number of OH groups of the polyols to the number of NCO groups of the polyisocyanates is particularly preferably 1:3 to 1:1.1, in particular 1:2.5 to 1:1.5.

The afore-mentioned polyurethanes synthesized may be used as a basis of the polyurethane compositions described herein. In various embodiments, these polyurethanes of the invention make up 2 to 50% by weight of the printable composition, preferably 5 to 45% by weight, in particular 10 to 40% by weight, particularly preferably 15 to 30% by weight. It is understood that the compositions then contain these polyurethanes and only residual amounts of the polyisocyanates.

Additionally, the printable composition contains at least one monomer and/or prepolymer that is polymerizable by exposure to radiation. The monomers and/or prepolymers polymerizable by exposure to radiation are those comprising reactive end groups selected from the group consisting of acrylates, methacrylates, alpha-olefins, N-vinyls, acrylamides, methacrylamides, styrenics, 1,3-dienes, vinyl halides, acrylonitriles, vinyl esters, maleimides, and vinyl ethers. Preferably the monomers and/or prepolymers polymerizable by exposure to radiation contain a carbon-carbon double bond. In the most preferred embodiment the monomer and/or prepolymer that is polymerizable by exposure to radiation is selected acrylates and/or methacrylates (herein also described as (meth)acrylates).

In some embodiments, the printable composition comprises a multifunctional (meth)acrylate monomer and/or a monofunctional (meth)acrylate monomer selected from the group consisting of alkyl (meth)acrylate, alkenyl (meth)acrylate and heterocyclic (meth)acrylate, or any combinations of these monomers, wherein the alkyl group has 1 to 20 carbon atoms and it can be further substituted, the alkenyl group has 2 to 20 carbon atoms and it can be further substituted, and the heterocyclic group has 2 to 20 carbon atoms and at least one heteroatom selected from nitrogen and oxygen, and it can be further substituted, wherein the substituent being at least one independently selected from the group consisting of an alkyl group having 1 to 10 carbon atoms, an alkoxy group having 1 to 10 carbon atoms, an aryloxy group having 6 to 10 carbon atoms, an epoxy group, and a hydroxy group; and amine groups.

Preferably the acrylate can be a polybutadiene containing a (meth)acryloxy group, polyisoprene containing a (meth)acryloxy group, polyurethane containing a (meth)acryloxy group and polyester containing a (meth)acryloxy group, or any combinations thereof. In a preferred embodiment, the monomer and/or prepolymer that is polymerizable by exposure to radiation can be polyurethane containing a (meth)acryloxy group; more preferably a aliphatic polyurethane containing a (meth)acryloxy group.

In a more preferred embodiment, the at least one monomer and/or prepolymer that is polymerizable by exposure to radiation is a dual reactive compound. In general, such a dual reactive compound comprises: (i) a first reactive group polymerizable by exposure to radiation, as mentioned above, and (ii) a second reactive group reactive with the polyisocyanate resin. One or more of each reactive groups may be included. Examples of suitable second reactive groups include, but are not limited to, hydroxyl, amine and thiol groups, preferably hydroxyl groups. Especially preferred are (meth)arcylates with at least one hydroxyl group as dual reactive compound. Examples include hydroxylalkyl(meth) arcylates, preferably with a C1 to C12 alkyl group. Especially preferred is hydroxyethyl(meth)acrylate.

In a preferred embodiment, the at least one monomer and/or prepolymer that is polymerizable by exposure to radiation, preferably a (meth)acrylate, preferably a (meth) acrylate containing at least one hydroxyl group, is comprised in an amount of 1 to 30 wt. %, preferably 5 to 20 wt. %, based on the total weight of the printable composition.

Furthermore, pasty polyurethane composition comprising at least one photoinitiator. Photoinitiators may be radical or cationic photoinitiators. Suitable compounds are well-known in the art and include, without limitation, benzoin ethers, such as benzoin methyl ether and benzoin isopropyl ether, substituted acetophenones, such as 2,2-diethoxyacetophenon, 2,2-dimethoxy-2-phenyl-1-phenylethanone, dimethoxyhydroxyacetophenone, substituted alpha-ketols, such as 2-methoxy-2-hydroxypropiophenone, aromatic sulfonylchlorides, such as 2-naphthyl sulfonyl chloride, and photoaktive oximes, such as 1-phenyl-1,2-propandion-2-(O-ethoxycarbonyl)oxime. The mentioned and further suitable photoinitiators can comprise the following residues: benzophenone-, acetophenone-, benzile-, benzoin-, hydroxyalkylphenone-, phenylcyclohexylketone-, anthrachinon-, trimethylbenzoylphosphinoxide-, methylthiophenylmorpholinketone-, aminoketone-, azobenzoin-, thioxanthon-, hexarylbisimidazole-, triazin-, or Fluorenone, wherein each of these residues may additionally be substituted with one or more halogen atoms and/or one or more alkoxy groups and/or one or more amino or hydroxy groups. Two preferred examples of a suitable photoinitiators are an oxyphenyl acetic acid ester based initiator and bis (2,4,6-trimethylbenzoyl)-phenyl-phosphinate.

The compositions contain the photoinitiators preferably in an amount of from about 0.01 to 5.0% by weight, preferably 0.1 to 4.0% by weight, more preferably 0.5 to 3% by weight, based in each case on the total weight of the composition. If a mixture of different photoinitiators is used, the amounts refer to the total amount in the composition.

In preferred embodiments, the printable polyurethane composition may comprise further to the photoinitiator an isocyanate curing catalyst, especially in case the printable compositions contains a polylol. Suitable isocyanate curing catalysts are well-known in the art and include tin compounds, preferably an organotin compound or an inorganic tin salt. Tin in these tin compounds is preferably bivalent or tetravalent. Suitable inorganic tin salts are, for example, tin(II) chloride and tin(IV) chloride. Organotin compounds (tin organyles) are used preferably as the tin compounds, however. Suitable organotin compounds are, for example, the 1,3-dicarbonyl compounds of bivalent or tetravalent tin, for example, the acetylacetonates such as di(n butyl)tin(IV) di(acetylacetonate), di(n-octyl)tin(IV) di(acetylacetonate), (n-octyl)(n-butyl)tin(IV) di(acetylacetonate); the dialkyl tin (IV) dicarboxylates, for example, di-n-butyltin dilaurate, di n butyltin maleate, di-n-butyltin diacetate, di-n-octyltin dilaurate, di-n-octyltin diacetate, or the corresponding dialkoxylates, for example, di-n-butyltin dimethoxide; oxides of tetravalent tin, for example, dialkyltin oxides, such as, for example, di-n-butyltin oxide and di-n-octyltin oxide; and the tin(II) carboxylates such as tin(II) octoate or tin(II) phenolate.

Also suitable are tin compounds of ethyl silicate, dimethyl maleate, diethyl maleate, dioctyl maleate, dimethyl phthalate, diethyl phthalate, dioctyl phthalate, such as, for example, di(n butyl)tin(IV) di(methyl maleate), di(n-butyl) tin(IV) di(butyl maleate), di(n-octyl)tin(IV) di(methyl maleate), di(n-octyl)tin(IV) di(butyl maleate), di(n-octyl)tin (IV) di(isooctyl maleate); and di(n butyl)tin(IV) sulfide, (n-butyl)2Sn(SCH2COO), (n-octyl)2Sn(SCH2COO), (n octyl)2Sn(SCH2CH2COO), (n-octyl)2Sn (SCH2CH2COOCH2CH2OCOCH2S), (n butyl)2-Sn (SCH2COO-i-C8H17)2, (n-octyl)2Sn(SCH2COO-i-C8H17)2, and (n-octyl)2Sn(SCH2COO-n-C8H17)2.

In some embodiments, the tin compound is selected from 1,3-dicarbonyl compounds of bivalent or tetravalent tin, the dialkyltin(IV) dicarboxylates, the dialkyltin(IV) dialkoxylates, the dialkyltin(IV) oxides, the tin(II) carboxylates, and mixtures thereof.

In various embodiments, the tin compound is a dialkyltin (IV) dicarboxylate, particularly dibutyltin dilaurate or dioctyltin dilaurate.

The compositions contain the polyisocyanate catalyst preferably in an amount of from about 0.001 to 1.0% by weight, preferably 0.01 to 0.5% by weight, based in each case on the total weight of the composition.

In a preferred embodiment, the pasty polyurethane composition contains at least one polyol. A "polyol" is understood to be a compound which contains at least two OH groups, irrespective or whether the compound contains other functional groups. However, a polyol used in accordance with this definition preferably contains only OH groups as functional groups or, if other functional groups are present, none of these other functional groups is reactive at least to isocyanates under the conditions prevailing during the reaction of the polyol(s) and polyisocyanate(s).

The polyols suitable generally include polyether polyols, polyester polyols, polycarbonates and the like, but are preferably polyether and/or polyester polyols. The polyether polyol is preferably a polyalkylene oxide, particularly preferably polyethylene oxide and/or polypropylene oxide. The number average molecular weight Mn of suitable polyethers and/or polyesters on which the polymer is based is preferably 200 to 30000 g/mol.

In a preferred embodiment, the polyol, preferably a polyester polyol, is comprised in an amount of 1 to 20 wt. %, preferably 2 to 10 wt. %, based on the total weight of the printable composition.

The polyol may react with the polyisocyanate to form the polyurethane in situ or upon application or may be pre-reacted with the polyisocyanate to yield a polyurethane. In the latter case, the composition may comprise a polyurethane that has been formed by reaction of the polyisocyanate and polyol as described above. It is understood that if the compositions contain such polyurethanes, then the combined amounts listed above for the polyisocyanates and polyols relate to the polyurethanes formed therefrom instead.

In some embodiments, the printable composition may further comprise core-shell particles, especially core-shell rubbers (CSRs). These core-shell particles can be used to improve the mechanical properties of the printed part, especially the toughness. In principle all known core-shell particles could be used. In various embodiments of the invention the core-shell rubbers can be dispersed in a resin matrix.

In preferred embodiments, both the core and the shell of the core-shell rubber consists of a polymer having glass transition temperatures preferably less than 0° C., preferably −30° C. or lower. The glass transition temperature can be determined by means of DSC (in accordance with DIN EN ISO 11357 at a heating rate of 10° C./min). The core-shell rubber particles preferably have a size of 0.03 to 50 μm, particularly preferably 1 to 20 μm, even more particularly preferably of less than 5 μm. A core-shell rubber particle usually even has an average diameter of just 500 nm or less than 200 nm, i.e. approximately 25 to 22 nm or 50 to 150 nm.

The core material of a CSR preferably consists of a diene homopolymer or a copolymer having elastomeric properties, such as a homopolymer of butadiene or isoprene, a copolymer of butadiene or isoprene with one or more ethylenically unsaturated monomer(s), such as vinyl aromatic monomer(s), (meth)acrylonitrile and/or (meth)acrylate. Preferred polymers as core material are selected from polybutadiene, polybutyl acrylate, polydimethylsiloxane, polyacrylates, polymethacrylates, poly(meth)acrylic acids and poly(meth) acrylic esters and co- or terpolymers thereof with polystyrene, polyacrylonitrile or polysulfide, more particularly preferably from polybutadiene, polydimethylsiloxane or polybutyl acrylate. Elastomeric polysiloxanes, such as polydimethylsiloxane or crosslinked polydimethylsiloxane, are also suitable as core material. The diene homo- and copolymers already disclosed above as core material are preferably also used as shell material.

If a polymer or a copolymer not having elastomeric properties (preferably a thermoplastic or thermoset/cross-linking polymer) is to be used as shell material, polymers of this type are selected for example from polystyrene, poly (meth)acrylamide, polyacrylonitrile, polyacrylate mono-, co- or terpolymers, polymethacrylate mono-, co- or terpolymers or styrene/acrylonitrile/glycidyl methacrylate terpolymers, or from a polymer or a copolymer from among one or more monomers of unsaturated acids and anhydrides (for example acrylic acid).

The core-shell rubber particles can consist of a number of layers, for example more than two layers. A CSR of this type preferably has a central core, which consists of a first diene homopolymer or copolymer having elastomeric properties, which is enclosed by a second core formed from a second (different) diene homopolymer or copolymer, likewise having elastomeric properties.

In various embodiments of the present invention the used CSRs have a core and at least two concentric shells having different chemical compositions and/or properties. Particles which have a core formed from polybutadiene and a shell formed from polybutadiene, polystyrene or a polybutadiene-polystyrene copolymer are preferred. Suitable CSRs are commercially obtainable for example from Kaneka and are present in the form of phase-separated particles dispersed in epoxy resins. These particles have a core formed from a copolymer of (meth)acrylate-butadiene-styrene, wherein butadiene is the primary component of the copolymer.

In various embodiments, the printable composition preferably contains 1 to 15 wt. %, preferably 2 to 10 wt. %, based on the total weight of the printable composition, of at least one of the above-described core-shell rubbers.

All printable compositions described herein may comprise at least one filler. The at least one filler, may, without limitation, be selected from chalk, powdered limestone, silica, such as precipitated and/or fumed silica, zeolites, bentonites, magnesium carbonate, kieselguhr, alumina, clay, tallow, titanium oxide, iron oxide, zinc oxide, sand, quartz, flint, mica, powdered glass and other ground minerals. In preferred embodiments, the filler(s) are precipitated and/or fumed silica. Furthermore, organic fillers can also be used, in particular carbon black, graphite, wood fibers, wood flour, sawdust, cellulose, cotton, pulp, wood chips, chopped straw, chaff, ground walnut shells and other short-cut fibers. Furthermore, short fibers such as glass fibers, glass filament, polyacrylonitrile, carbon fibers, Kevlar fibers or polyethylene fibers can also be added. Aluminum powder is also suitable as a filler. In addition, hollow spheres with a mineral shell or a plastic shell are suitable as fillers. These can be e.g. hollow glass spheres which are commercially available with the trade names Glass Bubbles®. Plastic-based hollow spheres are commercially available, e.g. with the names Expancel® or Dualite®. These are composed of inorganic or organic substances, each with a diameter of 1 mm or less, preferably of 500 μm or less. Generally, fillers which make the preparations thixotropic are preferred. These fillers are also described as rheological auxiliaries.

The filler(s) are preferably used in a quantity of 1 to 90 wt. %, preferably 5 to 30 wt. %, based on the total weight of the composition according to the invention. An individual filler or a combination of several fillers can be used.

In various embodiments, the filler comprises silica. For example, a highly disperse silica with a BET surface area (DIN ISO 9277; DIN 66132) of 10 to 500 m2/g can be used as a filler. The use of such a silica may contribute to reinforcing the hardened preparation. By means of this reinforcement, for example the initial strengths and tensile shear strengths of the hardened composition may be improved. Preferably, coated silicas with a BET surface area of 100 to 400, more preferably 100 to 300, in particular 150 to 300 and most particularly preferably 160 to 300 m2/g, are used. Suitable silicas are for example commercially available from Wacker under the tradename HDK®.

The printable compositions of the invention may also in principle all known in the prior art and conventional additional ingredients. Such additional ingredients include, but are not limited to, adhesion promoters, surfactants, plasticizers, diluents, reactive diluents, flow agents, coupling agents, wetting agents, flame retardants, preservatives, stabilizers, defoaming agents, pigments and dyes. In this case the additional components should preferably be non-UV absorbing. The additives are preferably present in an amount of less than 20% by weight, in particular less than 10% by weight, preferably less than 5% by weight, in each case based on the total printable composition.

EXAMPLES

The printable composition has been prepared by mixing at 80° C. 20 parts of triisocyanurate of hexamethylene diisocyanate, 13 parts of 2-hydroxyethylmethacrylate, 6.5 parts of a saturated copolyester containing hydroxyl groups, 0.07 parts dibutyltindilaurat, 60 parts of aluminium hydroxide and 1 part of a photoinitiator based on oxyphenyl acetic acid esters.

The printable composition were printed using a standard procedure for application of dual cure formulations using a Loctite 300 application robot and a Loctite UV cure cabinet (UVA Loc 1000) plus standard oven. After printing of each layer the layer has been pre-cured using a UV chamber (UVALOC 1000; 3rd platform, 5 s, 1000 W) or a UV LED. In this manner the layers have been printed on top of each other the gain a three-dimensional structure. After UV-curing the final layer, the printed object was put into an oven to final cure the printed structure.

The printable composition had a pasty behaviour with a viscosity factor (1.5/15) in the desired range. Objects printed with this composition by using the inventive method show a high resolution with a smooth surface and at the same time have a good interlayer adhesion and strong mechanical properties.

What is claimed is:

1. A method for additive manufacturing a three-dimensional part in a layer-by-layer manner, the method comprising:
   (i) providing a carrier substrate to support the three-dimensional part and a print head connected to a reservoir of a reactive curable printable composition;
   (ii) printing the reactive curable printable composition with the print head as extrudate strands onto the carrier substrate to form a first layer;
   (iii) printing the reactive curable printable composition with the print head as extrudate strands onto the first layer to form a second layer;
   (iv) optionally repeating step (iii) one or more times to form a third layer or the third layer and subsequent layer(s);
   (v) exposing the formed layers to radiation directly after forming each layer and/or after forming all of the layers; and
   (vi) curing the formed layers of the reactive curable printable composition to obtain the three-dimensional part,
   wherein the reactive curable printable composition is a pasty polyurethane composition comprising:
   at least one polyisocyanate resin;
   at least one monomer and/or prepolymer that is polymerizable by exposure to radiation; and
   at least one photoinitiator, wherein:
   the pasty polyurethane composition has a first viscosity factor (1.5/15) of at least 2 and a second viscosity factor (5/50) at an application temperature,
   the first viscosity factor (1.5/15) is the viscosity of the pasty polyurethane composition at a shear rate of 1.5/s divided by the viscosity of the pasty polyurethane composition at a shear rate of 15/s and the second viscosity factor (5/50) is the viscosity of the pasty polyurethane composition at a shear rate of 5/s divided by the viscosity of the pasty polyurethane composition at a shear rate of 50/s,
   the pasty polyurethane composition has a viscosity at a shear rate of 1.5/s of at least 10 Pas, and
   the first viscosity factor (1.5/15) is greater than the second viscosity factor (5/50).

2. The method of claim 1, wherein the distance of the print head to the carrier substrate or an already formed layer is equal to or greater than the thickness of the printed extrudate strands.

3. The method of claim 1, wherein the viscosity factor (1.5/15) at the application temperature is at least 3.0.

4. The method of claim 1, wherein the application temperature is in a range of from 15° C. to 80° C.

5. The method of claim 1, wherein the viscosity at the shear rate of 1.5/s is at least 20 Pas.

6. The method of claim 1, wherein the at least one polyisocyanate resin is an aliphatic polyisocyanate resin.

7. The method of claim 1, wherein the at least one monomer and/or prepolymer is a dual reactive compound.

8. The method of claim 1, wherein the pasty polyurethane composition further comprises an isocyanate curing catalyst.

9. The method of claim 1, wherein the pasty polyurethane composition further comprises at least one polyol.

* * * * *